(No Model.) 2 Sheets—Sheet 1.

R. BELL & W. C. LE PETRIE.
MACHINE FOR FILLING MOLDS.

No. 540,349. Patented June 4, 1895.

WITNESSES
Frank G. Parker.
Eva A. Guild

INVENTORS
Richard Bell
Wm C. Le Petrie (No Model.) 2 Sheets—Sheet 2.

R. BELL & W. C. LE PETRIE.
MACHINE FOR FILLING MOLDS.

No. 540,349. Patented June 4, 1895.

WITNESSES
Frank G. Parker.
Eva A. Guild

INVENTORS
Richard Bell
Wm. C. Le Petrie

UNITED STATES PATENT OFFICE.

RICHARD BELL AND WILLIAM C. LE PETRIE, OF BOSTON, ASSIGNORS TO THE CONFECTIONERS MACHINERY AND MANUFACTURING COMPANY, OF SPRINGFIELD, MASSACHUSETTS.

MACHINE FOR FILLING MOLDS.

SPECIFICATION forming part of Letters Patent No. 540,349, dated June 4, 1895.

Application filed October 25, 1894. Serial No. 526,906. (No model.)

*To all whom it may concern:*

Be it known that we, RICHARD BELL and WILLIAM C. LE PETRIE, of Boston, in the county of Suffolk and State of Massachusetts, have invented a new and useful Improvement in Machines for Filling Molds, adapted more especially for the use of confectioners, of which the following is a specification.

Our invention is intended as an improvement upon the machine described in Letters Patent No. 449,668, granted to Neil A. Clacher April 7, 1891, although it may be used with other machines.

It relates more especially to means for evening off and regulating the consistency of the material with which the mold is filled and the removal from the mold of the surplus material.

Our invention will be understood by reference to the drawings, in which—

Figure 1:
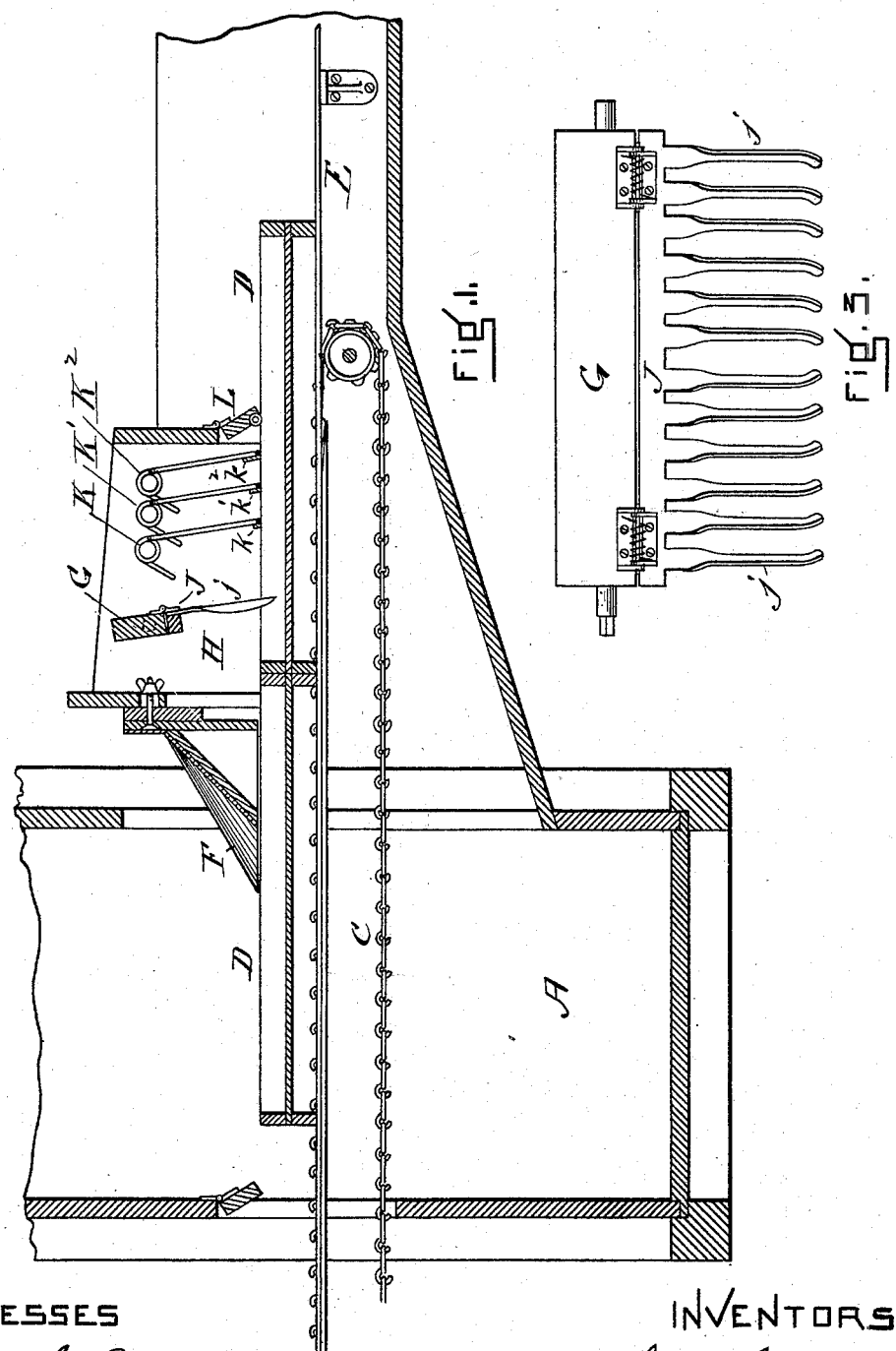
Figure 2:
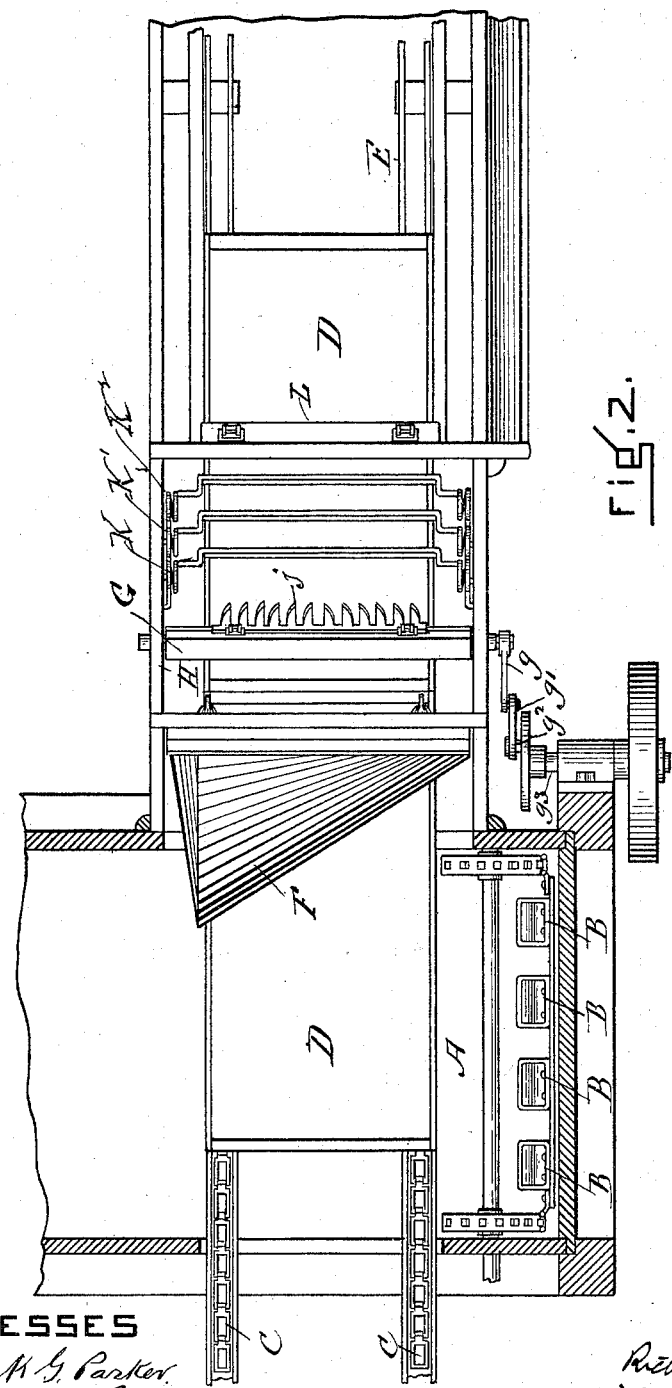

Figure 1 is a longitudinal vertical section, and Fig. 2 is a horizontal section showing plan of our improvements. Fig. 3 is a detail showing the loosening mechanism.

A is the bin for the pulverized starch from which it is lifted to be deposited in the mold box D by an endless chain carrying filling buckets B. C is an endless chain for the purpose of carrying the mold boxes D under the filling buckets by which they are filled with the starch, and then out through the delivery chamber H. E is a track on which these mold boxes are delivered from the chain C. These parts, with the exception of the delivery chamber H, are substantially the same as in the Clacher patent above referred to. The track E may be extended to any convenient length, being preferably made considerably longer than is shown in that patent.

The tendency of the buckets, when emptying, is to throw the starch in the direction of their motion, and hence one side of the mold box is apt to be filled too full and the other side is left partly empty. In order to prevent any depressions from this cause in the surface of the filled mold box, we provide a triangular plow F which is attached to the inner wall of the filling chamber, over the outlet through which the mold box passes. This plow is set at an angle to the path of the mold box as shown, its lower edge being in a horizontal plane just above the level of the top of the mold box, and its widest part being located to engage with the upwardly projecting pile of starch. It will therefore even off the starch in every mold box which passes beneath it, pushing the starch from the side which is too full, to the side which is partly empty, thus filling it and finally scraping off the surplus starch which falls back again into the bin. The starch having been evened off by the plow F, the mold box now preferably passes out under a loosener. This loosener is preferably constructed as follows: It consists of a cross piece G to which is hinged the comb J having a series of fingers $j$ projecting from its lower edge. We prefer to connect the cross piece G and comb J by spring hinges as shown, so that if necessary there may be a certain amount of play between these two parts, this being especially desirable when the front or rear edge of a mold box is passing under the fingers $j$. The construction of these fingers will be understood from Fig. 3. They are curved slightly at the bottom and twisted so they will reach well down into the starch, and by moving them backward and forward, the starch will be loosened.

The cross piece G is hung in the delivery chamber H and carries an arm $g$. A rocking motion is given to the loosener from the crank pin $g^2$ on the shaft $g^3$ by means of the connecting rod $g'$, which connects the pin $g^2$ with the arm $g$. The loosener is constantly oscillated, its fingers running backward and forward through the starch in the mold, loosening it and preventing it from caking. This loosener is especially useful in damp weather and when the same starch has been used many times so that it has absorbed more or less of the moisture, from the candy which has been molded therein. At such times, without some means for loosening the starch, it becomes so packed in the mold that no impression can be made in it by the dies, as ordinarily used. The upper surface of the mold must of course be smoothed off again after this loosening process, and for this purpose we prefer to use a series of yielding scrapers K, K', K². These parts are preferably formed of U-shaped wires, the upper ends of which are wound to form springs and are firmly attached to the inner walls of the delivery box, their lower edges being normally slightly lower than the plane of the upper edge of the mold boxes, the springs allowing the scrapers to yield to and ride over the advancing mold box.

The lower edge of each part K, K', K² is preferably formed of a narrow strip of sheet metal, which forms the scraper proper. These parts differ in width, the scraper k' being slightly wider than the scraper k and the scraper k² slightly wider than the scraper k', so that as these scrapers ride along the surface of the filled box, the scraper K scrapes off but little of the starch, most of it riding over the part k and falling back into the mold so that it will fill up any cavities lying between K and K'. The part k' of scraper K' in the same way scrapes off some of the starch but some of it falls back into the mold. The scraper K² scrapes substantially all the remaining starch off from the mold, at the same time substantially filling any remaining irregularities in its upper surface. These scrapers are located in the delivery box. The piece L, which closes the mouth of the delivery box also serves to finish the scraping process. It is hinged by a spring hinge to the frame and settles the starch in the mold box well down into place, and allows the mold to be delivered full, and yet not too full, but with a smooth upper surface. The mold box is still fed along by the endless chain C and is delivered upon the track E which may be long enough to contain a number of these boxes in a row, according as seems convenient.

The advantages of these various improvements will be understood by all skilled in the art. Machines of this class are of great utility, but so far as we are aware, have been defective up to the time of our invention in that the mold boxes were delivered either not evenly filled or with the starch packed too tightly therein. Our improvements have overcome these difficulties.

The shape and location of the plow must depend somewhat upon the relative position and movements of the mold boxes and buckets, as the main purpose of the plow is to fill any cavities in the mold box which are caused by the irregular filling of the buckets, by pushing the surplus starch into those cavities, or back into the bin, when those cavities have been filled.

The function of the loosener is to loosen or stir up the contents of the box so as to prevent it from being packed too tightly. For this purpose it is only necessary that a series of properly shaped fingers shall pass through the contents of the box, after it has been filled and smoothed off.

The device which we have shown, seems to us the simplest and most effective for the purpose, but it is evident that if the loosener had no motion, it would in a measure accomplish this result, as the mold boxes are fed under it. It is desirable that the delivery box shall be covered.

What we claim as our invention is—

1. In a mold filling machine, in combination with the filling mechanism and means for conveying mold boxes thereunder, a plow of the kind described, the scraping edge of which lies at an obtuse angle to the path of the mold box which passes under it, and just above the upper edge of said mold box, whereby the surplus material scraped from the top of the mold box is thrown off at substantially right angles to its line of motion, all as set forth.

2. In a mold filling machine, in combination with means for filling the mold boxes, an oscillating loosener located above the path of the mold box and having a set of downwardly projecting fingers adapted to enter the contents of the mold box, arranged as and for the purposes set forth.

3. In a mold filling machine, in combination with mechanism for filling and conveying the mold boxes, a set of yielding scrapers located to ride along the upper edges of the mold box, the first scraper in series having a narrow scraping edge, and each succeeding scraper having a wider scraping edge than the one which precedes it, all as and for the purposes set forth.

4. In a mold filling machine, in combination with mechanism for filling and conveying the mold boxes, a loosening mechanism of substantially the kind described, whereby the material with which the mold box has been filled, is prevented from packing, in combination with a scraping mechanism located to engage with the mold boxes, after they have passed under the loosening mechanism, whereby any depressions are filled and any surplus material is scraped from the upper surface of the mold box, all as set forth.

In witness whereof we have hereunto set our hands this 20th day of October, 1894.

RICHARD BELL.
W. C. LE PETRIE.

Witnesses:
RICHD. J. MCNULTY,
GEORGE O. G. COALE.